United States Patent
Hunt et al.

(10) Patent No.: US 10,778,704 B2
(45) Date of Patent: *Sep. 15, 2020

(54) SYSTEMS AND METHODS FOR PHISHING AND BRAND PROTECTION

(71) Applicant: McAfee, LLC, Santa Clara, CA (US)

(72) Inventors: Simon Hunt, Naples, FL (US); Venkata Ramanan Sambandam, Sunnyvale, CA (US)

(73) Assignee: Mcafee, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,984

(22) Filed: Feb. 4, 2019

(65) Prior Publication Data

US 2019/0173894 A1 Jun. 6, 2019

Related U.S. Application Data

(63) Continuation of application No. 14/818,875, filed on Aug. 5, 2015, now Pat. No. 10,200,381.

(51) Int. Cl.
*H04L 29/06* (2006.01)
*G06F 21/64* (2013.01)

(52) U.S. Cl.
CPC ........ *H04L 63/1416* (2013.01); *G06F 21/645* (2013.01); *G06F 2221/2119* (2013.01)

(58) Field of Classification Search
CPC ............... H04L 63/1416; G06F 21/645; G06F 2221/2119

(Continued)

(56) References Cited

U.S. PATENT DOCUMENTS

| 8,381,292 B1 | 2/2013 | Warner et al. |
| 9,124,623 B1 | 9/2015 | Chen |

(Continued)

FOREIGN PATENT DOCUMENTS

| CN | 101826105 | 9/2010 |
| CN | 102769632 | 11/2012 |

(Continued)

OTHER PUBLICATIONS

Japanese Patent Office, "Notification of Reasons for Refusal," issued in connection with Japanese Patent Application No. 2017-567467, dated Feb. 27, 2019, 2 pages.

(Continued)

*Primary Examiner* — Ali Shayanfar
*Assistant Examiner* — Sakinah White Taylor
(74) *Attorney, Agent, or Firm* — Hanley, Flight & Zimmerman, LLC

(57) ABSTRACT

Systems and methods for phishing and brand protection of websites via copycat detection are disclosed herein. An example apparatus includes at least one processor, a display, and memory including instructions that, when executed, cause the at least one processor to determine a first hash of a first image in a webpage and a second hash of a second image in the webpage, the second image different from the first image, the first hash different from the second hash, generate a temporary page profile associated with the webpage based on the first hash and the second hash, fuzzy match the temporary page profile to a baseline page profile, and in response to a determination that the temporary page profile does not match the baseline page profile, generate an alert to be displayed via the display to indicate that fraud has been detected for the webpage.

19 Claims, 4 Drawing Sheets

(58) Field of Classification Search
USPC .......................................................... 726/23
See application file for complete search history.

(56) References Cited

U.S. PATENT DOCUMENTS

| | | | |
|---|---|---|---|
| 2006/0080735 | A1 | 4/2006 | Brinson et al. |
| 2007/0118528 | A1 | 5/2007 | Choi et al. |
| 2008/0046738 | A1 | 2/2008 | Galloway et al. |
| 2008/0219495 | A1* | 9/2008 | Hulten .................. G06F 16/583 382/100 |
| 2008/0263026 | A1* | 10/2008 | Sasturkar .............. G06F 16/951 |
| 2009/0055928 | A1 | 2/2009 | Kang et al. |
| 2009/0064325 | A1 | 4/2009 | Ford et al. |
| 2009/0220166 | A1 | 9/2009 | Choi et al. |
| 2009/0300014 | A1 | 12/2009 | Chakrabarti et al. |
| 2010/0100964 | A1 | 4/2010 | Mahaffey et al. |
| 2010/0186088 | A1 | 7/2010 | Banerjee et al. |
| 2013/0232549 | A1 | 9/2013 | Hawkes |
| 2014/0359411 | A1* | 12/2014 | Botta .................. G06F 17/2288 715/205 |
| 2014/0359760 | A1 | 12/2014 | Gupta et al. |
| 2015/0310124 | A1 | 10/2015 | Ben-Aharon et al. |
| 2016/0140626 | A1 | 5/2016 | Agarwal et al. |
| 2018/0239986 | A1 | 8/2018 | Huang |

FOREIGN PATENT DOCUMENTS

| | | |
|---|---|---|
| CN | 102932348 | 2/2013 |
| CN | 107852412 | 3/2018 |
| GB | 2462456 | 2/2010 |
| JP | 2007310793 | 11/2007 |
| JP | 2014102612 | 6/2014 |
| JP | 2014197375 | 10/2014 |
| KR | 20070067651 | 6/2007 |

OTHER PUBLICATIONS

The International Bureau, "International Preliminary Report on Patentability," issued in connection with application No. PCT/US2016/041739, dated Feb. 15, 2018, 5 pages.

United States Patent and Trademark Office, "Non-Final Office Action," issued in connection with U.S. Appl. No. 14/818,875, dated Dec. 1, 2016, 13 pages.

United States Patent and Trademark Office, "Final Office Action," issued in connection with U.S. Appl. No. 14/818,875, dated Jun. 28, 2017, 13 pages.

United States Patent and Trademark Office, "Non-Final Office Action," issued in connection with U.S. Appl. No. 14/818,875, dated Dec. 26, 2017, 15 pages.

United States Patent and Trademark Office, "Final Office Action," issued in connection with U.S. Appl. No. 14/818,875, dated May 3, 2018, 12 pages.

United States Patent and Trademark Office, "Advisory Action," issued in connection with U.S. Appl. No. 14/818,875, dated Aug. 28, 2018, 3 pages.

United States Patent and Trademark Office, "Notice of Allowance," issued in connection with U.S. Appl. No. 14/818,875, dated Dec. 13, 2018, 13 pages.

Japanese Patent Office, "Notification of Reasons for Refusal," issued in connection with Japanese Patent Application No. 2017-567467, dated Feb. 27, 2019, 4 pages.

Chinese National Intellectual Property Administration, "First Office Action and Search Report," issued in connection to Chinese Patent Application No. 201680043733.0, dated Feb. 21, 2020, 7 pages.

* cited by examiner

SYSTEMS AND METHODS FOR PHISHING AND BRAND PROTECTION

RELATED APPLICATION

This patent arises from a continuation of U.S. patent application Ser. No. 14/818,875, (now U.S. Pat. No. 10,200, 381) which was filed on Aug. 5, 2015, and was granted on Feb. 5, 2019. U.S. patent application Ser. No. 14/818,875 is hereby incorporated herein by reference in its entirety. Priority to U.S. patent application Ser. No. 14/818,875 is hereby claimed.

TECHNICAL FIELD

This disclosure generally relates to systems and methods for phishing and brand protection of websites via copycat detection.

BACKGROUND

As malware protection becomes more effective, there is an increasing use of phishing and copycat websites that use social engineering to convince users of their legitimacy, capturing credentials from users and creating fraudulent transactions. Current solutions rely on fuzzy domain name matching, certificate and security checks, domain/IP reputation and user reported lists to identify potentially harmful websites. Some mechanisms for identifying potentially harmful websites may utilize a content classification engine that may process a webpage and categorize the webpage based on the content displayed on the webpage.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
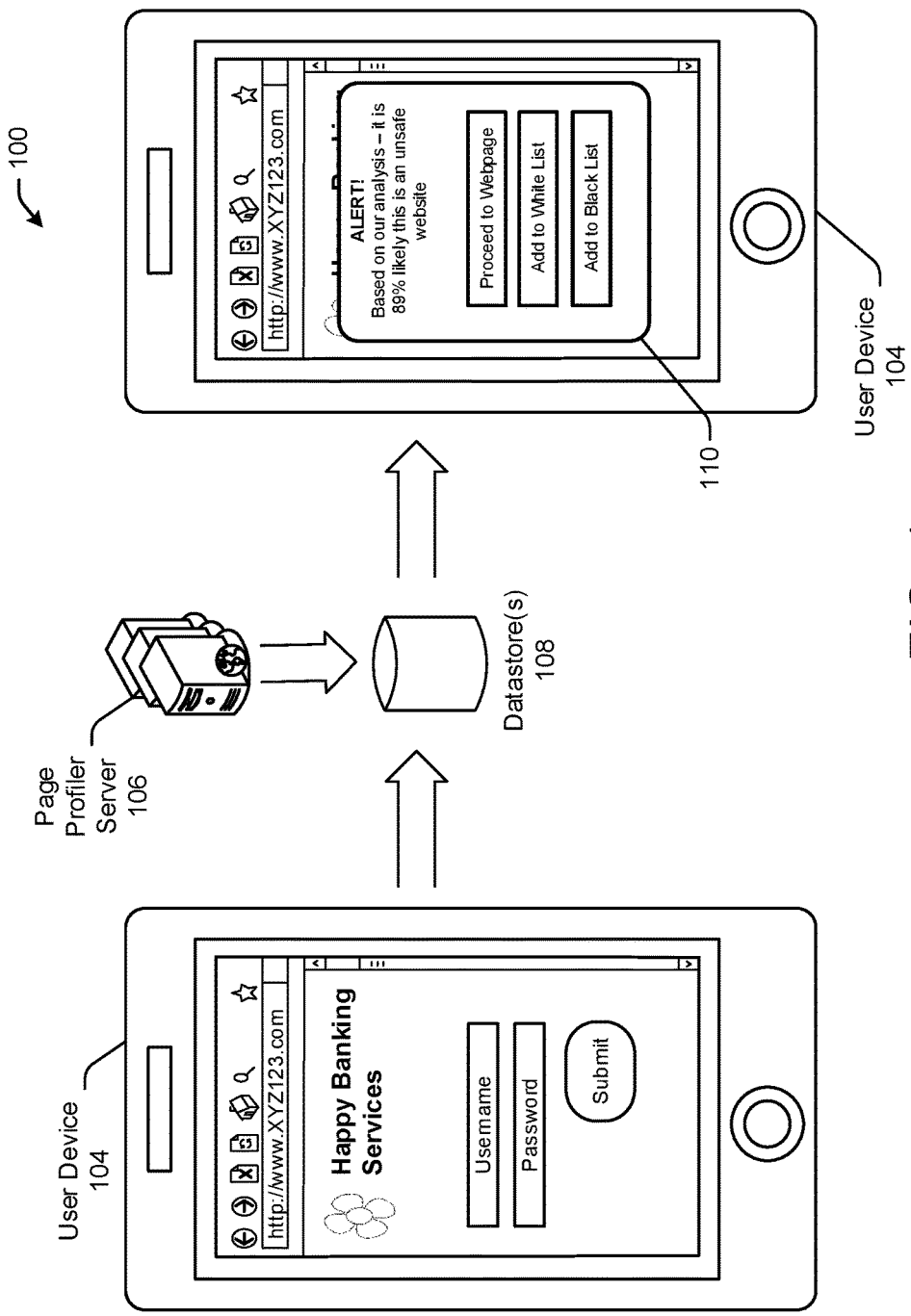
FIG. 1 depicts an illustrative data flow between various components of an illustrative system architecture a system for phishing and brand protection in accordance with one or more embodiments of the disclosure.

This disclosure relates to, among other things, systems, methods, computer-readable media, techniques and methodology for a system for fraud detection, such as phishing of websites. For example, a bank may be associated with a legitimate website that a user may frequently utilize for online banking. The website may require the user to provide authentication credentials to access their account (e.g., username and password). A fraudulent website may copy the web site of the banks to mimic the look and feel of the web site. In some embodiments, the fraudulent website may be exactly the same as the legitimate website except that the server designated to receive the authentication credentials may differ so that the authentication credentials may be captured and transmitted to an unauthorized server. In some cases, such fraudulent websites are only active for a short durations (e.g., a few hours, a few days) and are difficult to detect using traditional techniques. The systems and methods described herein are directed to detecting such fraudulent websites and alerting the user prior to the user providing sensitive information, such as authorization credentials.

In some embodiments, the legitimate website may be profiled by a page profiler server, where a unique digital fingerprint is generated for the website. The unique digital fingerprint may be known as a baseline page profile. A baseline page profile may include different components, such as an image component, geometry component, style component, and/or link component. Each component may be derived from the processed website. For example, the image component may be derived by identifying and copying each image from the web site, such as a logo, and applying a hash to the images and storing the hashes as the image component of the baseline page profile. The baseline page profile may be stored in a datastore or may be transmitted to one or more user devices to be used in the fraud detection process.

In some embodiments, a user may have a page checker component on their user device. The page checker component may be used to detect potentially fraudulent websites. A user may interact with a browser on the user device and request a webpage. The page checker component may determine whether the requested webpage has already been identified and processed to detect fraud by retrieving a list and determining whether the requested webpage in on the list. If the webpage is on the list, then the page checker component may permit the browser to retrieve the requested webpage and display the webpage to the user. If, however, the requested webpage is not on the list, the page checker component may process the webpage to detect fraud prior to displaying the webpage to the user.

The page checker component may retrieve the requested webpage and generate a temporary page profile. The temporary page profile may be generated in a similar manner as the baseline page profile, where the temporary page profile include an image component, geometry component, style component, and/or link component. Each component may be derived by processing the requested website. The page checker component may then retrieve one or more baseline page profiles and compare the temporary page profile of the requested webpage to the one or more baseline page profiles. In some embodiments, the profiles may be compared using a fuzzy match algorithm.

If the page checker component determines that the temporary page profile matches the baseline page profile, the page checker component may indicate that no fraud was detected in the requested webpage and the page checker component may permit the browser to display the requested webpage to the user.

If the page checker component determines that the temporary page profile does not match the baseline page profile, the page checker component may indicate that the webpage is likely fraudulent. The page checker component may generate and display an alert to the user. The alert may include several options. The options may include proceeding to the webpage, adding the webpage to a white list, or adding the webpage to a black list. A white list is a list of webpages that the page checker component determined were likely fraudulent and that the user has requested to view and have access to despite the fraud detection. A black list is a list of webpages that the page checker component determined was likely fraudulent and that the user has requested be blocked from being displaying on the user device.

The page checker component may then add the domain or URL associated with the temporary page profile to the list of websites that have been identified and processed for fraud detection.

In some embodiments, a page profiler server may receive one or more webpages to profile. The webpages may be received or identified by popularity, through a website crawler, upon processing of a webpage encountered by a user, or other such mechanisms. The page profiler may determine whether the page has already been identified and profiled. If the page has not already been profiled, the page profiler server may process the webpage to generate a baseline page profile that comprises different components. To generate the baseline page profile, the page profiler may identify images (e.g., logos), obtain the images from the webpage, and hash the images. The page profiler server may then derive a geometry of the webpage. For example, the page profiler server may process the webpage to determine a layout of the webpage. The page profiler server may then obtain colors and font information used in the webpage. The page profiler server may obtain link information from the webpage. In some embodiments, the page profiler server may obtain additional metrics that may be used to generate a unique profile of the webpage. The page profiler server may use the obtained information to generate and store the baseline page profile. The page profiler server may transmit the baseline page profile to one or more datastores for storage.

A page checker component may be stored on the mobile device, for example, in conjunction with the web browser of the mobile device. The user may utilize the browser to navigate to a webpage. The page checker component may be used to determine whether the webpage is harmful, for example, fraudulent or malicious. For example, the page checking component may determine whether the webpage has already been identified and processed. If the page has previously been identified and processed for fraud detection, then the page checker component may display a message to the user. If the page has not been previously identified or processed, the page checker component may generate a temporary page profile for the webpage. The page checker component may then retrieve previously generated baseline page profiles, for example, from the datastore, and may compare the temporary page profile with the previously generated baseline page profiles to determine if there is a match. If there is not a match, then the page checker component may allow the browser to continue displaying the webpage without modification. If the page checker component determines there is a match, an appropriate message may be displayed to the user and the result may be stored in the datastore.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases and System Architecture

FIG. 1 depicts an illustrative data flow between various components of an illustrative system architecture a system for phishing and brand protection in accordance with one or more embodiments of the disclosure.

The user device(s) 104 may include any suitable processor-driven computing device capable of WiFi and non-WiFi access, including, but not limited to, tablet computing devices, electronic book (e-book) readers, netbook computers, notebook computers, laptop computers, Ultrabook™ computers, personal digital assistants (PDA), smart phones, web-enabled televisions, video game consoles, set top boxes (STB), digital video recorder (DVR) systems, combinations thereof, or the like. For ease of explanation, the user device(s) 104 may be described herein in the singular; however, it should be appreciated that multiple user device(s) 104 may be provided.

The page profiler server(s) 106 may include any suitable processor-driven computing device including, but not limited to, a desktop computing device, a laptop computing device, a server, a smartphone, a tablet, and so forth. For ease of explanation, the page profiler server(s) 106 may be described herein in the singular; however, it should be appreciated that multiple page profiler server(s) 106 may be provided.

The datastore(s) 108 may include may include any suitable datastore capable of storing information received from one or more devices over a network and may be accessed by one or more devices over the network For ease of explanation, the datastore(s) 108 may be described herein in the singular; however, it should be appreciated that datastore(s) 108 may be provided.

In some embodiments, a user may interact with a user device 104. The user may initiate a browser and request a webpage. A page checking component, such as a page checking engine, may reside on the user device 104 and may be initiated when a triggering event occurs. In some embodiments, the triggering event may be determining that a webpage has not been previously been identified and processed for fraud detection. The triggering event may include comparing the web site or URL to a list of known webpages that have been previously identified and processed. The list of known webpages may be maintained locally by the page checking component or may be stored on a remote server and retrieved when needed. The page checking component may process the requested page and generate a temporary page profile. The page checking component may then retrieve one or more previously generated baseline page profiles from the datastore 108, and then compare the temporary page profile against the one or more baseline page profiles. The previously generated baseline page profiles may have been generated by a page profiler server 106 and transmitted to the datastore 108 for storage. The page checking component may determine, based on the comparison, that the webpage is fraudulent, harmful, or malicious and may generate and display an alert 110 to the user.

Figure 2:
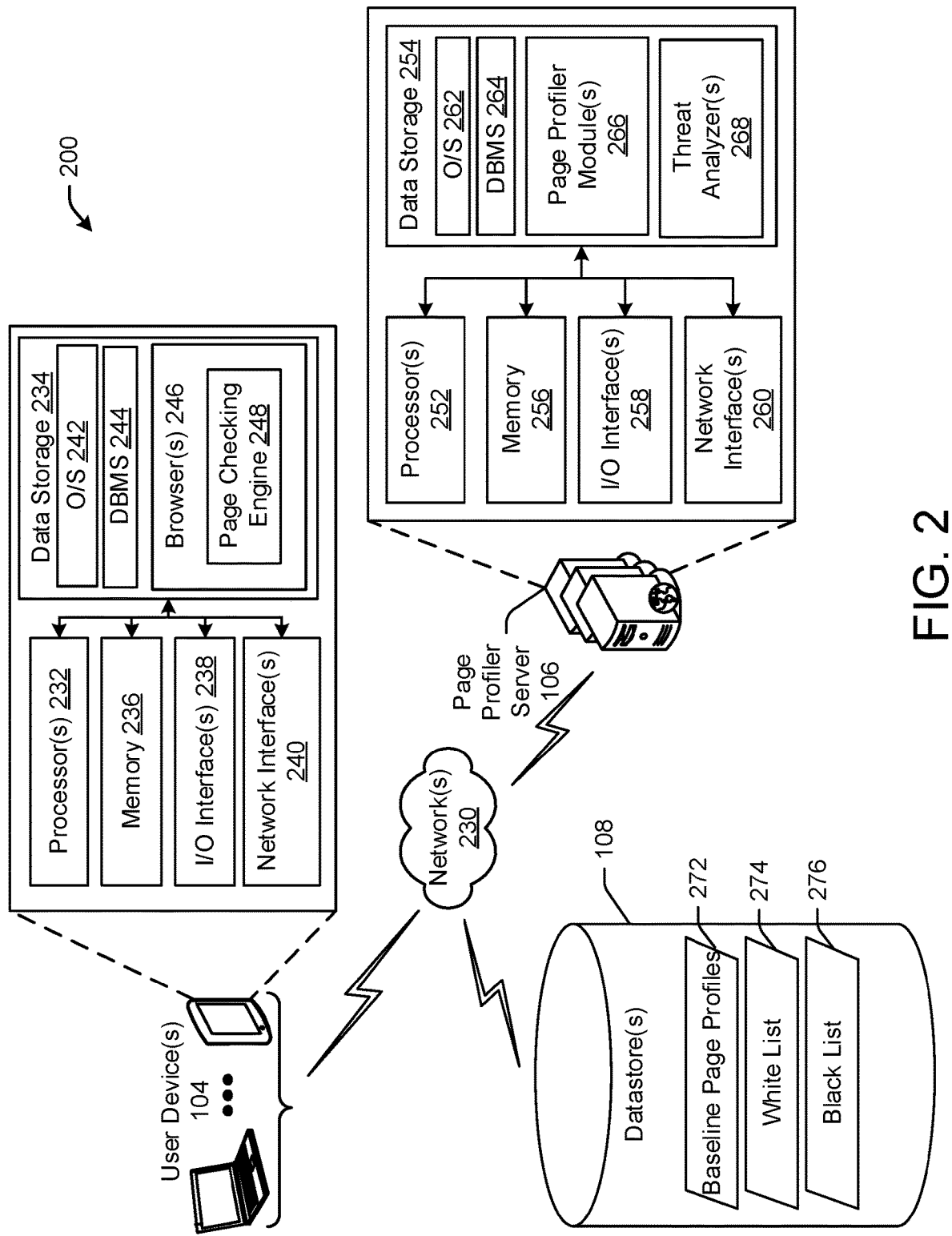
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture depicted in FIG. 1 in accordance with one or more embodiments of the disclosure. The illustrative architecture 200 may include multiple user device(s) 104, one or more page profiler server(s) 106, and/or one or more datastore(s) 108. The user device(s) 104, page profiler server(s) 106, and/or datastore(s) 108 may include any of the types of devices described through reference to FIG. 1.

Any of the user device(s) 104, one or more page profiler server(s) 106, and/or one or more datastore(s) 108 may be configured to communicate with each other and any other component of the architecture 200 via one or more network(s) 230. The network(s) 230 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 230 may have any suitable communication range associated therewith and may include, for example, global networks (e.g., the Internet), metropolitan area networks (MANs), wide area networks (WANs), local area networks (LANs), wireless personal area networks (WPANs), or personal area networks (PANs). In addition, the network(s) 230 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The user device(s) 104 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from data storage 234 and loaded into memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into memory 236 as needed for execution. Depending on the configuration and implementation of the user device(s) 104, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The user device(s) 104 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The user device(s) 104 may further include network interface(s) 240 that facilitate communication between the user device(s) 104 and other devices of the illustrative system architecture 200 or application software via the network(s) 230. The user device(s) 104 may additionally include one or more input/output (I/O) interfaces 238 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 234, various program modules, applications, or the like, may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the user device 104 and the hardware resources of the user device 104. More specifically, the O/S 242 may include a set of computer-executable instructions for managing the hardware resources of the user device(s) 104 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores 108. The DBMS 244 may use any of a variety of database models (e.g., relational model, object model, etc.) and may support any of a variety of query languages. The data storage 234 may additionally include various other program modules that may include computer-executable instructions for supporting a variety of associated functionality. For example, the data storage 234 may include one or more browser(s) 246 and/or one or more page checking engines(s) 248.

The browser(s) 246 may include computer-executable instructions that in response to execution by the processor(s) 232 cause operations to be performed including communicating with one or more web servers to obtain webpages and display them on the user device 104 to a user.

The page checking engine(s) 248 may include computer-executable instructions that in response to execution by the processor(s) 232 cause operations to be performed including determining whether a webpage requested by the browser 246 is fraudulent, harmful or malicious by processing the webpage to generate a temporary page profile, displaying an alert to the user if the webpage is determined to be fraudulent, harmful or malicious, and optionally facilitating storage of the temporary page profile as a page profile for future consideration in identifying webpages that are fraudulent, harmful or malicious. In some embodiments, the page checking engine 248 may identify or determine that a trigger event has occurred. A trigger event may be an event that initiates the generation of the temporary page profile for an identified webpage. An example of a trigger event may include a user requesting a webpage that has not previously been processed to determine if the webpage is fraudulent, harmful, or malicious.

The page checking engine 248 may retrieve the requested webpage, and if the webpage has not previously identified and processed, then the page checking engine 248 may generate a temporary page profile for the webpage. In some embodiments, the temporary page profile may act as a unique identifier associated with the webpage. The temporary page profile may include different components, such as an image component, a geometry component, style component, and a linking component. The page checking engine 248 may retrieve one or more baseline page profile 272s generated by the page profiler module 266 to determine whether the webpage requested by the user is the same as a known baseline page profile 272 generated by a page profiler server 106. If the webpage is the same as the known baseline page profile 272, then it is unlikely that the requested page is fraudulent, harmful, or malicious.

To generate the image component of the temporary page profile, the page checking engine 248 may identify and obtain one or more images from the webpage. The page checking engine 248 may hash the images and store the hashes of the images as the image component of the temporary page profile.

To generate the geometry component of the temporary page profile, the page checking engine 248 may derive a geometry of the webpage. In some embodiments, the page checking engine 248 may derive the geometry of the webpage by removing superfluous items from the page source and retaining the bare layout information. For example, to determine a basic layout of the webpage, the page checking engine 248 may remove advertisements and content and may note the location of images and input boxes. An example of the geometry of the webpage may be "image 1—top left, image 2—bottom center, 2 input boxes center aligned vertically spaced."

To generate the style component of the temporary page profile, the page checking engine 248 may obtain color and font information from the webpage. For example, the page checking engine 248 may capture information, such as background colors, palette, fonts, and other information by using the cascading style sheet (CSS) associated with the webpage.

To generate the linking component of the temporary page profile, the page checking engine 248 may obtain link information from the webpage. In some embodiments, the page checking engine 248 may identify one or more links in the page source of the webpage and may generate a list of the off-domain links on the webpage.

In some embodiments, the page checking engine may analyze the content of the webpage. For example, the page checking engine 248 may capture the type of data that the website captures. For example, the webpage may include a request(s) and associated input field(s) for user social security numbers, credit card numbers, addresses, and other personally identifying information. The page checking engine 248 may also categorize the webpage using the content displayed on the webpage.

In some embodiments the page checking engine 248 may be integrated with the browser 246, such as a plug-in application. In some embodiments, the page checking engine 248 may be stored as a separate application in datastore 234 on the user device 104 and initiated when triggered.

The page profiler server(s) 106 may include one or more processors (processor(s)) 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from data storage 254 and loaded into memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into memory 256 as needed for execution. Depending on the configuration and implementation of the broker server(s) 106, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The page profiler server(s) 106 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The page profiler server(s) 106 may further include network interface(s) 260 that facilitate communication between the page profiler server(s) 106 and other devices of the illustrative system architecture 200 (e.g., user device(s) 104, etc.) or application software via the network(s) 230. The page profiler server(s) 106 may additionally include one or more input/output (I/O) interfaces 258 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 254, various program modules, applications, or the like, may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the page profiler server(s) 106 and the hardware resources of the page profiler server(s) 106. More specifically, the O/S 262 may include a set of computer-executable instructions for managing the hardware resources of the page profiler server(s) 106 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores. The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more page profiler module(s) 266.

The page profiler module(s) 266 may include computer-executable instructions that in response to execution by the processor(s) 252 cause operations to be performed including generating baseline page profiles 272 for identified webpages. The baseline page profiles 272 may be used by the page checking engine 248 to determine whether a webpage is fraudulent, harmful, or malicious.

The page profiler module 266 may generate a baseline page profile 272 that includes different components, such as an image component, a geometry component, style component, and a linking component. To generate the image component of the baseline page profile, the page profiler module 266 may identify and obtain one or more images from the webpage. The page profiler module 266 may hash the images and store the hashes of the images as the image component of the temporary page profile.

To generate the geometry component of the baseline page profile, the page profiler module 266 may derive a geometry of the webpage. In some embodiments, the page profiler module 266 may derive the geometry of the webpage by removing superfluous items from the page source and retaining the bare layout information. An example of the geometry of the webpage may be "image 1—top left, image 2—bottom center, 2 input boxes center aligned vertically spaced."

To generate the style component of the baseline page profile 272, the page profiler module 266 may obtain color and font information from the webpage. For example, the page profiler module 266 may capture information, such as background colors, palette, fonts, and other information by using the cascading style sheet (CSS) associated with the webpage.

To generate the linking component of the baseline page profile 272, the page profiler module 266 may obtain link information from the webpage. In some embodiments, the page profiler module 266 may identify one or more links in the page source of the webpage and may generate a list of the off-domain links on the webpage.

In some embodiments, the page profiler module 266 may analyze the content of the webpage. For example, the page profiler module 266 may capture the type of data that the website captures. For example, the webpage may include a request(s) for and provide associated input field(s) for user social security numbers, credit card numbers, addresses, and other personally identifying information. The page profiler module 266 may also categorize the webpage using the content displayed on the webpage.

The page profiler module 266 may transmit the generated baseline page profiles 272 to a user device 104 and/or datastore that may be accessed by a user device 104.

In some embodiments, the architecture 200 may include one or more datastore(s) 108. The one or more datastore(s) may receive data from one or more user device(s) 104 and/or one or more page profiler server(s) 106. In some embodiments, the generated page profiles 272 may be transmitted to the datastore 108 for storage and may be retrieved when determining if a page is harmful or malicious by the page checking engine 248. The datastore 108 may also store a white list 274 and/or a black list 276 of webpages based on the generated profiles and user interactions. A white list 274 may be a list that is indicative of webpages that were found to be harmful or malicious based on the generated baseline page profile 272 but that the user indicated they would like access to the webpage. A black list 276 may be a list that is indicative of webpages that were found to be harmful or malicious based on the generated baseline page profile 272 and that user has indicated should be blocked.

Those of ordinary skill in the art will appreciate that any of the components of the architecture 200 may include alternate and/or additional hardware, software or firmware components beyond those described or depicted without departing from the scope of the disclosure. More particularly, it should be appreciated that software, firmware or hardware components depicted or described as forming part of any of the illustrative components of the architecture 200, and the associated functionality that such components support, are merely illustrative and that some components may not be present or additional components may be provided in various embodiments. While various program modules have been depicted and described with respect to various illustrative components of the architecture 200, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, firmware and/or hardware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative networked architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative architecture 200, or additional functionality.

Illustrative Processes

Figure 3:
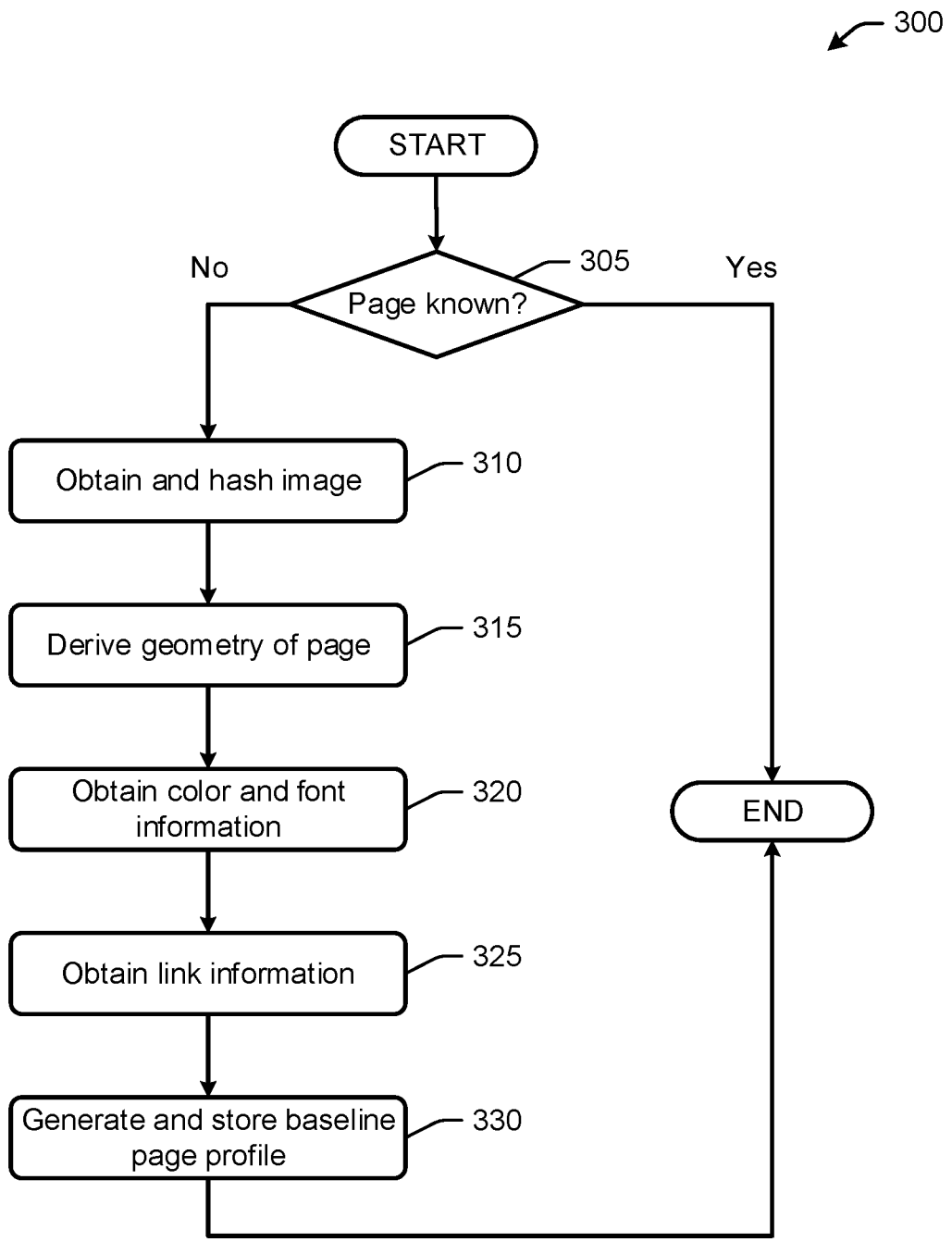
FIG. 3 is a process flow diagram of an illustrative method for generating baseline page profiles of websites for phishing and brand protection in accordance with one or more embodiments of the disclosure.

FIG. 3 is a process flow diagram of an illustrative method 300 for generating baseline page profiles of websites by a page profiler server 106 for phishing and brand protection in accordance with one or more embodiments of the disclosure. At block 305, the page profiler module 266 may determine whether an identified webpage has been previously identified and processed. For example, the page profiler module 266 may compare the domain of the identified webpage to known websites with associated baseline page profiles 272 stored in a datastore 108. If at block 305, the page profiler module 266 determines that the webpage was previously identified and processed, then the method may proceed to termination. If at block 305, the page profiler module 266 determines that the webpage was not previously identified and processed, the method may proceed to step 310. At block 310, the page profiler module 266 may obtain and hash images from the webpage. The page profiler module 266 may process the webpage to identify images (e.g., logos) and store approximations or hashes of the images.

At block 315, the page profiler module 266 may derive a geometry of the webpage, for example, by removing superfluous items from the page source and retaining the bare layout information. An example of the geometry of the webpage may be "image 1—top left, image 2—bottom center, 2 input boxes center aligned vertically spaced."

At block 320, the page profiler module 266 may obtain color and font information from the webpage. For example, the page profiler module 266 may capture information, such as background colors, palette, fonts, and other information by processing the webpage. In some embodiments, the page profiler module 266 may obtain such information for the cascading style sheet (CSS) associated with the webpage.

At block 325, the page profiler module 266 may obtain link information from the webpage. In some embodiments, the page profiler module 266 may generate a list of the off-domain links on the page. The page profiler module 266 may capture the servers that the website is communicating with in the list.

In some embodiments, the page profiler module 266 may obtain other information while processing the webpage. For example, the page profiler module 266 may capture the type of data that the website captures. For example, the webpage may obtain user social security numbers, credit card numbers, addresses, and other personally identifying information. The page profiler module 266 may also categorize the webpage using the content displayed on the webpage.

At block 330, the page profiler module 266 may generate a baseline page profile 272 associated with the webpage using the data obtained in blocks 310-325 as well as any other data obtained by the page profiler module 266 while processing the webpage. The page profiler module 266 may generate a baseline page profile 272, otherwise known as a page fingerprint, and may transmit the generated baseline page profile 272 to one or more datastores 108. In some embodiments, the page profiler module 266 may transmit the generated baseline page profile 272 to one or more user devices 104.

In some embodiments, the page profiler module 266 may generate or re-generate baseline page profiles at periodic time intervals (e.g., hourly, weekly, monthly, and yearly, etc.). In some embodiments, the page profiler module 266 may generate baseline page profiles in response to an event. For example, a baseline page profile 272 may be generated in response to determining that a previously identified webpage has been updated with new content or a new layout.

In some embodiments, a temporary page profile may be generated by a page checking engine 248 executing on a user device 104 using similar techniques and methods as the page profiler module 266 in generating baseline page profiles. For example, temporary page profiles may be generated using similar techniques as described in steps 310-330.

Figure 4:
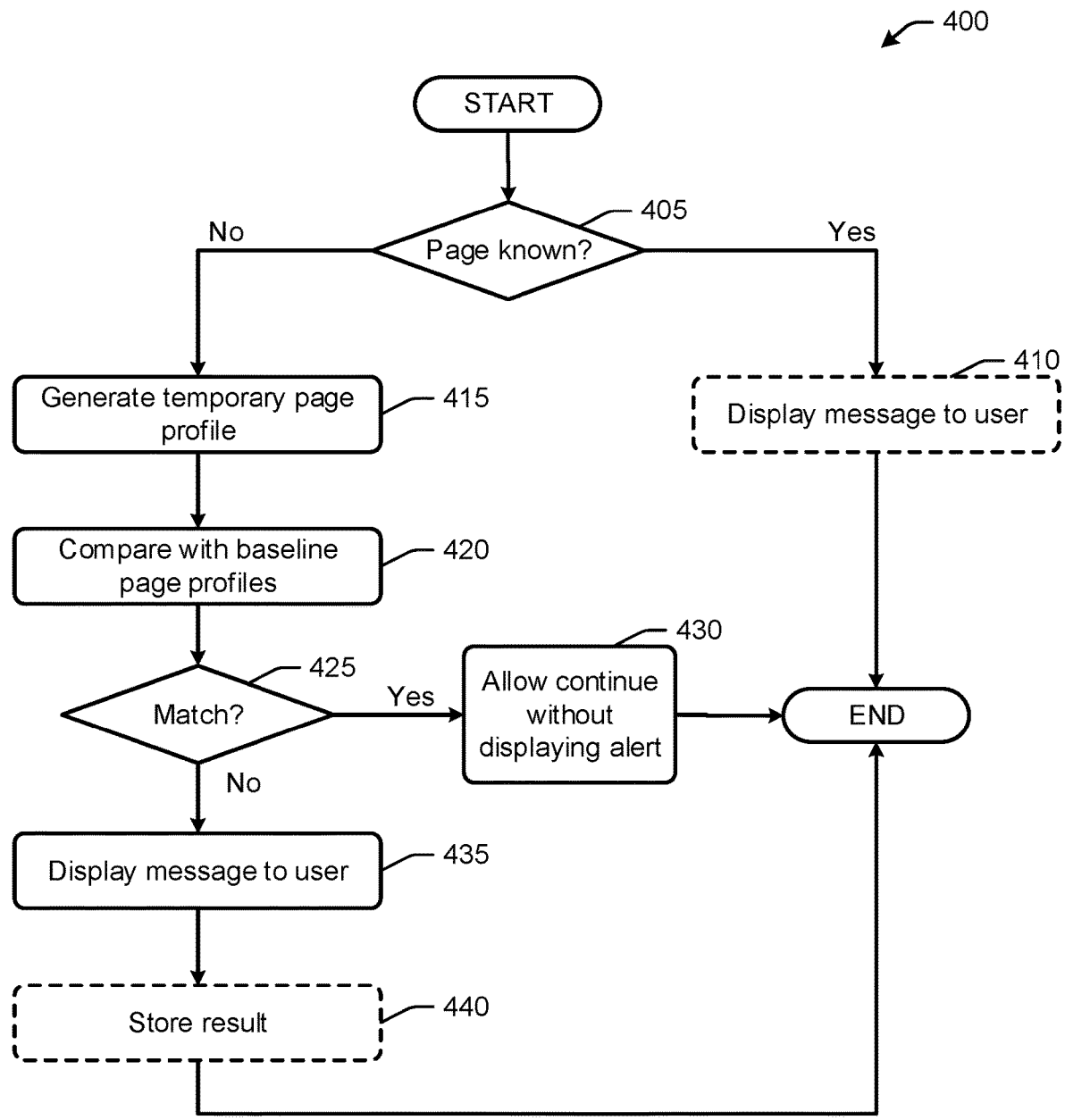
FIG. 4 is a process flow diagram of an illustrative method for identifying potentially harmful websites in a system for phishing and brand protection in accordance with one or more embodiments of the disclosure.

FIG. 4 is a process flow diagram of an illustrative method 400 for identifying potentially harmful websites by a user device 104 in a system for phishing and brand protection in accordance with one or more embodiments of the disclosure. At block 405, the page checking engine 248 may determine whether the webpage is known (e.g., previously identified and processed for fraud detection). The page checking engine 248 may determine whether the webpage is known by retrieving a list of known webpages that have previously been identified and processed and determining whether the requested webpage is on the list. In some embodiments, the list may be a list that comprises both the white list and black list of webpages. In some embodiments, the list may indicate that the white list and black list should also be checked. If the webpage is known (e.g., on the list), then the method may proceed to block 410, where the page checking engine 248 may optionally display a message to the user indicating that the webpage has already been processed. For example, if the webpage is determined to be known and on the whitelist, the webpage may be displayed to the user without an alert or any other visual or audio indication. If the webpage is on the blacklist, the page checking engine 248 may generate an alert informing the user that the requested page had been previously processed and determined to be fraudulent and on the black list. The alert may permit the user to change the webpage designation (e.g., from black list to white list) or may allow the user to access the webpage once without removing the webpage from the blacklist.

If at block 405, it is determined that the webpage is not known, then the method may proceed to block 415. At block 415, the page checking engine 248 may generate a temporary page profile. For example, a temporary profile may include an image component, a geometry component, a style component, and/or a link component. The temporary page profile may be generated using similar techniques and methods as those described in relation to FIG. 3 with regards to generating baseline page profiles. For example, the page checking engine 248 may obtain and hash images from the requested webpage. The page checking engine 248 may process the webpage to identify images (e.g., logos) and store approximations or hashes of the images. The page checking engine 248 may derive a geometry of the webpage, for example, by removing superfluous items from the page source and retaining the bare layout information. An example of the geometry of the webpage may be "image 1—top left, image 2—bottom center, 2 input boxes center aligned vertically spaced." The page checking engine 248 may obtain color and font information from the webpage. For example, the page checking engine 248 may capture information, such as background colors, palette, fonts, and other information by processing the webpage. In some embodiments, the page checking engine 248 may obtain such information for the cascading style sheet (CSS) associated with the webpage.

The page checking engine 248 may obtain link information from the webpage. In some embodiments, the page checking engine 248 may generate a list of the off-domain links on the page. The page checking engine 248 may capture the servers that the website is communicating with in the list.

In some embodiments, the page checking engine 248 may obtain other information while processing the webpage. For example, the page checking engine 248 may capture the type of data that the website captures. For example, the webpage may obtain user social security numbers, credit card numbers, addresses, and other personally identifying information. The page checking engine 248 may also categorize the webpage using the content displayed on the webpage.

The page checking engine 248 also may generate a temporary page profile associated with the webpage based on the different information obtained while processing the webpage. For example, the page checking engine 248 may also analyze the content of the webpage and may categorize the webpage based on its content. For example, the page checking engine 248 may determine that mobile banking website is a financial website whereas a website, such as Amazon.com, is a retail shopping website.

At block 420, the page checking engine 248 may compare the temporary page profile of the webpage with the baseline page profiles generated by the page profiler module 266 of the page profiler 106. In some embodiments, the page checking engine 248 may compare the temporary page profile of the webpage with one or more baseline page profiles using a fuzzy match algorithm. In some embodiments, the baseline page profiles may be retrieved from a datastore 108 in real-time to avoid undue delays in the user experience. In some embodiments, the user device 104 may have previously received the baseline page profiles from the page profiler server 106 and may have stored them to local storage. For example, the page profiler server 106 may transmit baseline page profiles to the user device 104 as they are generated so that the page checking engine 248 may retrieve locally stored baseline page profiles while it processes requested webpages and/or generates the temporary profile. Retrieving locally stored baseline page profiles may reduce any unnecessary delays (e.g., latency delays), ensuring that requested webpages are processed quickly to determine if there is fraud. Alternatively, the user device may dynamically retrieve the baseline page profiles as the user device 104 is in operation based on predicted webpages that may be accessed by the user device.

At block 425, the page checking engine 248 may determine whether the temporary page profile associated with the webpage matches any baseline page profiles. In some embodiments, the page checking engine 248 may use an approximation algorithm or fuzzy matching algorithm, such as a MinHash algorithm, to determine if the requested page is a derivative of a registered page. For example, the page checking engine 248 may determine that there is a match if the approximation algorithm determines that the temporary page profile has a percentage match to a page profile of a registered page and the percentage match exceeds a predetermined threshold (e.g., 80%).

If at block 425, the page checking engine 248 determines there is not a match, then the method may proceed to block 430. At block 430, the page checking engine 248 may permit the web browser to continue displaying the webpage without modification or displaying a message to the user.

If at block 425, the page checking engine 248 determines there is a match, then the method may proceed to block 435. At block 435, the page checking engine 248 may display a message to the user. In some embodiments, the message may alert the user that the webpage is likely harmful or malicious. In some embodiments, the message may comprise multiple options that may be presented to the user. The options may include the option to ignore the alert and proceed to the webpage, the option to add the webpage to a white list 274, and/or the option to add the webpage to a black list 276. In some embodiments, the white list 274 may indicate that the webpage has been identified as malicious or harmful, but that the user would like to permit future access to the webpage. The black list 276 may indicate that the webpage has been identified as malicious or harmful and that the browser 246 will not be permitted to access the webpage in the future.

At optional block 440, the page checking engine 248 may store the temporary page profile as a baseline page profile 272 in the datastore 108 for future use. In some embodiments, the page checking engine 248 may store the temporary page profile as a baseline page profile 272 in local storage of the user device 104.

In some embodiments, the page checking engine 248 may report the webpage as fraudulent to a threat analyzer. The report may include the baseline page profile 272 and the temporary page profile. The threat analyzer may further analyze the webpage for malicious activities and the webpage may be categorized based on the content of the webpage. Once the webpage is categorized, categorizers may be able to identify the web site, thereby preventing other users from the threat.

In one embodiment, a computer-readable medium may store computer-executable instructions which, when executed by a processor, cause the processor to perform operations, including generating a temporary page profile associated with a webpage, wherein the temporary page profile comprises an image component, a geometry component, a style component, and a link component; retrieving one or more baseline page profiles; comparing the temporary page profile to the one or more baseline page profiles; determining that the temporary page profile does not match the one or more baseline page profiles; and generating an alert to display to a user indicating that fraud has been detected for the webpage.

In one aspect of an embodiment, comparing the temporary page profile to the one or more baseline page profiles may further comprise comparing the temporary page profile to the one or more baseline page profiles using a fuzzy matching algorithm. In one aspect of an embodiment, the fuzzy matching algorithm may be a MinHash algorithm. In one aspect of an embodiment, the alert may include options displayed to the user and the operations may further comprise receiving an indication from the user that the webpage should be displayed, added to a white list, or added to a black list. In one aspect of an embodiment, the operations may further comprise determining a triggering event has occurred; and generating the temporary page profile associated with the webpage in response to the determining the triggering event has occurred. In one aspect of an embodiment, the operations may further comprise storing the temporary page profile as a baseline page profile. In one aspect of an embodiment, the operations may further comprise transmitting a report to a threat analyzer indicating that the webpage is fraudulent, wherein the report comprises the temporary page profile and the baseline page profile.

In one embodiment, a system may comprise at least one memory storing computer-executable instructions; and at least one processor, wherein the at least one processor is configured to access the at least one memory and to execute the computer-executable instructions to generate a temporary page profile associated with a webpage, wherein the temporary page profile comprises an image component, a geometry component, a style component, and a link component; retrieve one or more baseline page profiles; compare the temporary page profile to the one or more baseline page profiles; determine that the temporary page profile does not match the one or more baseline page profiles; and generate an alert to display to a user indicating that fraud has been detected for the webpage.

In one aspect of an embodiment, to compare the temporary page profile to the one or more baseline page profile, the at least one processor may be further configured to execute the computer-executable instructions to compare the temporary page profile to the one or more baseline page profiles using a fuzzy matching algorithm. In one aspect of an embodiment, the fuzzy matching algorithm may a MinHash algorithm. In one aspect of an embodiment, the alert may comprise options displayed to the user and the at least one processor may be further configured to execute the computer-executable instructions to receive an indication from the user that the webpage should be displayed, added to a white list, or added to a black list. In one aspect of an embodiment, the at least one processor may be further configured to execute the computer-executable instructions to determine a triggering event has occurred; and generate the temporary page profile associated with the webpage in response to the determining the triggering event has occurred. In one aspect of an embodiment, the at least one processor may be further configured to execute the computer-executable instructions to store the temporary page profile as a baseline page profile. In one aspect of an embodiment, the at least one processor may be further configured to execute the computer-executable instructions to transmit a report to a threat analyzer indicating that the webpage is fraudulent, wherein the report comprises the temporary page profile and the baseline page profile.

In one embodiment, a method may comprise generating a temporary page profile associated with a webpage, wherein the temporary page profile comprises an image component, a geometry component, a style component, and a link component; retrieving one or more baseline page profiles; comparing the temporary page profile to the one or more baseline page profiles; determining that the temporary page profile does not match the one or more baseline page profiles; and generating an alert to display to a user indicating that fraud has been detected for the webpage.

In one aspect of an embodiment, comparing the temporary page profile to the one or more baseline page profiles may further comprise comparing the temporary page profile to the one or more baseline page profiles using a fuzzy matching algorithm. In one aspect of an embodiment, the fuzzy matching algorithm may be a MinHash algorithm. In one aspect of an embodiment, the alert may comprise options displayed to the user and the method may further comprise receiving an indication from the user that the webpage should be displayed, added to a white list, or added to a black list. In one aspect of an embodiment, the method may further comprise determining a triggering event has occurred; and generating the temporary page profile associated with the webpage in response to the determining the triggering event has occurred. In one aspect of an embodiment, the method may further comprise storing the temporary page profile as a baseline page profile. The method may further comprise transmitting a report to a threat analyzer indicating that the webpage is fraudulent, wherein the report comprises the temporary page profile and the baseline page profile.

In one embodiment, an apparatus may comprise at least one memory storing computer-executable instructions; and at least one processor, wherein the at least one processor is configured to access the at least one memory and to execute the computer-executable instructions to generate a temporary page profile associated with a webpage, wherein the temporary page profile comprises an image component, a geometry component, a style component, and a link component; retrieve one or more baseline page profiles; compare the temporary page profile to the one or more baseline page profiles; determine that the temporary page profile does not match the one or more baseline page profiles; and generate an alert to display to a user indicating that fraud has been detected for the webpage.

In one aspect of an embodiment, to compare the temporary page profile to the one or more baseline page profile, the at least one processor may be further configured to execute the computer-executable instructions to compare the temporary page profile to the one or more baseline page profiles using a fuzzy matching algorithm. In one aspect of an embodiment, the fuzzy matching algorithm may a MinHash algorithm. In one aspect of an embodiment, the alert may comprise options displayed to the user and the at least one processor may be further configured to execute the computer-executable instructions to receive an indication from the user that the webpage should be displayed, added to a white list, or added to a black list. In one aspect of an embodiment, the at least one processor may be further configured to execute the computer-executable instructions to determine a triggering event has occurred; and generate the temporary page profile associated with the webpage in response to the determining the triggering event has occurred. In one aspect of an embodiment, the at least one processor may be further configured to execute the computer-executable instructions to store the temporary page profile as a baseline page profile. In one aspect of an embodiment, the at least one processor may be further configured to execute the computer-executable instructions to transmit a report to a threat analyzer indicating that the webpage is fraudulent, wherein the report comprises the temporary page profile and the baseline page profile.

In one embodiment, a system may comprise a means for generating a temporary page profile associated with a webpage, wherein the temporary page profile comprises an image component, a geometry component, a style component, and a link component; a means for retrieving one or more baseline page profiles; a means for comparing the temporary page profile to the one or more baseline page profiles; a means for determining that the temporary page profile does not match the one or more baseline page profiles; and a means for generating an alert to display to a user indicating that fraud has been detected for the webpage.

In one aspect of an embodiment, the means for comparing the temporary page profile to the one or more baseline page profiles may further comprises a means for comparing the temporary page profile to the one or more baseline page profiles using a fuzzy matching algorithm. In one aspect of an embodiment, the fuzzy matching algorithm may be a MinHash algorithm. In one aspect of an embodiment, the alert may comprise options displayed to the user and the system may further comprise a means for receiving an indication from the user that the webpage should be displayed, added to a white list, or added to a black list. In one aspect of na embodiment, the system may comprise a means for determining a triggering event has occurred; and a means for generating the temporary page profile associated with the webpage in response to the determining the triggering event has occurred. In one aspect of an embodiment, the system may comprise a means for storing the temporary page profile as a baseline page profile. In one aspect of an embodiment, the system may comprise a means for transmitting a report to a threat analyzer indicating that the webpage is fraudulent, wherein the report comprises the temporary page profile and the baseline page profile.

CONCLUSION

It should be appreciated that the program modules, applications, computer-executable instructions, code, or the like depicted in this disclosure as being stored in data storage are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on a device (e.g., user device 104, broker 106, incident response server 108), and/or hosted on other computing device(s) accessible via one or more networks, may be provided to support functionality provided by the program modules, applications, or computer-executable code depicted herein and/or additional or alternate functionality. Further, functionality may be modularized differently such that processing described as being supported collectively by the collection of program modules described herein may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules described herein may be implemented, at least partially, in hardware and/or firmware across any number of devices.

It should further be appreciated that a device (e.g., user device 104, broker 106, incident response server 108, etc.) may include alternate and/or additional hardware, software, or firmware components beyond those described or depicted without departing from the scope of the disclosure. More particularly, it should be appreciated that software, firmware, or hardware components depicted as forming part of the device (e.g., user device 104, broker 106, incident response server 108, etc.) are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods 300-600 may have been described above as being performed by one or more components of a device, or more specifically, by one or more one or more program modules executing on such a device. It should be appreciated, however, that any of the operations of methods 300-600 may be performed, at least in part, in a distributed manner by one or more other devices or systems, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of any of the method 300 may be described in the context of the illustrative user device 600, it should be appreciated that such operations may be implemented in connection with numerous other system configurations.

The operations described and depicted in the illustrative methods of FIG. 3-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 3-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/ or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. An apparatus to detect fraud in a webpage, the apparatus comprising:

at least one processor;

a display;

memory including instructions that, when executed, cause the at least one processor to:
- determine a first hash of a first image in the webpage and a second hash of a second image in the webpage, the second image different from the first image, the first hash different from the second hash;
- generate a temporary page profile associated with the webpage based on the first hash, the second hash, and font information captured from a style document associated with the webpage;
- fuzzy match the temporary page profile to a baseline page profile;
- in response to a determination that the temporary page profile does not match the baseline page profile, generate an alert to be displayed via the display to indicate that fraud has been detected for the webpage; and
- initiate transmission of a report to a remote location, the report indicating that the webpage is fraudulent, the report to include the temporary page profile and the baseline page profile.

2. The apparatus of claim 1, wherein the at least one processor is to add the webpage to a white list in response to an input from a user.

3. The apparatus of claim 1, wherein the at least one processor is to generate the temporary page profile associated with the webpage in response to a trigger event indicating fraud associated with the webpage.

4. The apparatus of claim 1, wherein the at least one processor is to store the temporary page profile as the baseline page profile.

5. The apparatus of claim 1, wherein the at least one processor is to fuzzy match the temporary page profile to the baseline page profile based on a MinHash matching algorithm.

6. The apparatus of claim 1, wherein the at least one processor is to retrieve the baseline page profile from the memory.

7. The apparatus of claim 1, wherein the processor is further to generate the temporary page profile based on color information from the style document corresponding to the webpage.

8. The apparatus of claim 1, wherein the processor is further to generate the temporary page profile based on geometry information of the webpage, the geometry information identified by removing superfluous items from a page source of the webpage and retaining bare layout information.

9. A storage disk or storage device comprising computer-executable instructions which, when executed by a processor, cause the processor to at least:
- determine a first hash of a first image in a webpage and a second hash of a second image in the webpage, the second image different from the first image, the first hash different from the second hash;
- generate a temporary page profile associated with the webpage based on the first hash, the second hash, and font information captured from a style document associated with the webpage;
- fuzzy match the temporary page profile to a baseline page profile;
- in response to a determination that the temporary page profile does not match the baseline page profile, generate an alert to indicate that fraud has been detected for the webpage; and
- initiate transmission of a report to a remote location, the report to indicate that the webpage is fraudulent, the report to include the temporary page profile and the baseline page profile.

10. The storage disk or storage device of claim 9, wherein the instructions, when executed, cause the processor to add the webpage to a white list in response to an input from a user.

11. The storage disk or storage device of claim 9, wherein the instructions, when executed, cause the processor to generate the temporary page profile associated with the webpage in response to a trigger event corresponding to fraud associated with the webpage.

12. The storage disk or storage device of claim 9, wherein the instructions, when executed, cause the processor to initiate storage of the temporary page profile as the baseline page profile.

13. The storage disk or storage device of claim 9, wherein the instructions, when executed, cause the processor to fuzzy match the temporary page profile to the baseline page profile based on a MinHash matching algorithm.

14. The storage disk or storage device of claim 9, wherein the instructions, when executed, cause the processor to initiate retrieval of the baseline page profile from a local memory.

15. A method to detect fraud in a webpage, the method comprising:
- determine, by executing an instruction with a processor, a first hash of a first image in the webpage and a second hash of a second image in the webpage, the second image different from the first image, the first hash different from the second hash;
- generating a temporary page profile associated with the webpage based on the first hash, the second hash, and font information captured from a style document associated with the webpage;
- fuzzy matching, by executing an instruction with the processor, the temporary page profile to a baseline page profile;
- in response to a determination that the temporary page profile does not match the baseline page profile, generating an alert to indicate that fraud has been detected for the webpage; and
- transmitting a report to a remote location, the report to indicate that the webpage is fraudulent, the report to include the temporary page profile and the baseline page profile.

16. The method of claim 15, further including adding the webpage to a white list in response to an input from a user.

17. The method of claim 15, further including generating the temporary page profile associated with the webpage in response to a trigger event corresponding to fraud associated with the webpage.

18. The method of claim 15, further including initiating storage of the temporary page profile as the baseline page profile.

19. The method of claim 15, wherein the fuzzy matching of the temporary page profile to the baseline page profile includes invoking a MinHash matching algorithm.

* * * * *